United States Patent Office 3,397,808
Patented Aug. 20, 1968

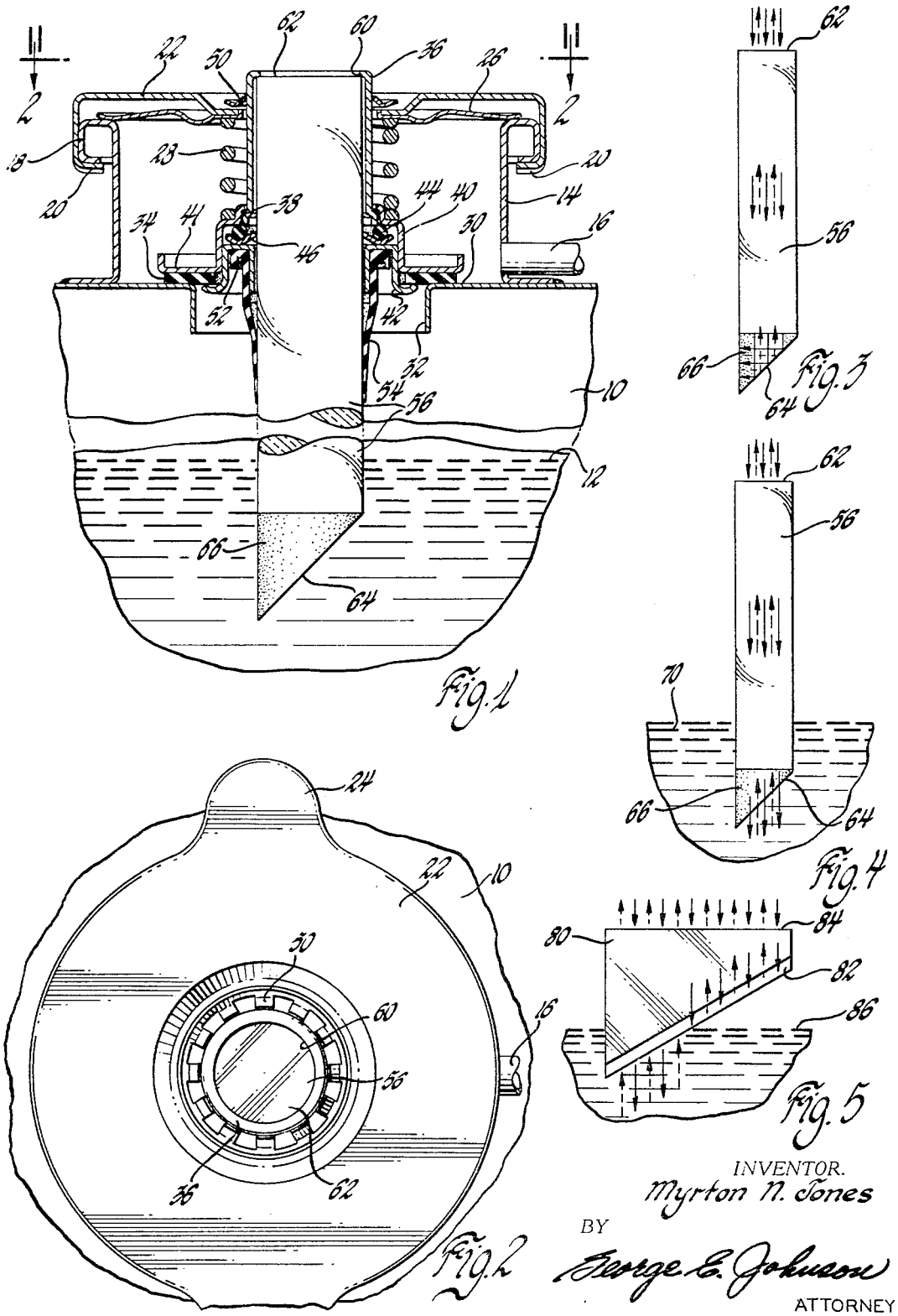

3,397,808
LEVEL INDICATING TANK CLOSURE
Myrton N. Jones, Flint, Mich., assignor to General
Motors Corporation, Detroit, Mich., a corporation
of Deleware
Filed Sept. 29, 1965, Ser. No. 491,356
2 Claims. (Cl. 220—44)

ABSTRACT OF THE DISCLOSURE

A removable automobile radiator cap having a light transmitting element extending through the cap so that a requisite level of engine coolant will contact the lower end of the element and that contact or lack of contact will be apparent.

---

This invention relates to a liquid level indicating device and more particularly to a removable cap or closure for a tank or vessel such as an automobile radiator top tank and which cap or closure is adapted to indicate the liquid level in the tank.

Checking the level of liquid in a tank usually necessitates removal of a closure on the tank and often incurs a loss of liquid particularly if the tank is pressurized. The present invention avoids the loss of liquid and it also provides a convenient operating technique combined with an automatic venting characteristic.

An object of the present invention is to provide a removable closure for a tank by means of which the liquid level in the latter may conveniently be determined by visual observation and also by means of which venting and filling are facilitated.

A feature of the present invention is a tank closure attachable to and detachable from a tank and having a venting feature as well as a transparent element adapted to transmit light from the interior of the tank to indicate the liquid level in the latter.

This and other important features will now be described in detail in the specification and then pointed out more particularly in the appended claims.

In the drawings:

FIGURE 1 shows a section of a radiator tank and a closure therefor which closure forms an embodiment of the present invention;

FIGURE 2 is a view looking down on the closure of FIGURE 1—i.e.—a view looking in the direction of the arrows 2—2 in FIGURE 1;

FIGURE 3 is a detail view, drawn to a smaller scale, of a solid transparent element used in the closure assembly of FIGURE 1, arrows showing light paths in the absence of liquid;

FIGURE 4 is a view similar to that of FIGURE 3 but with liquid present to modify the paths of light beams; and FIGURE 5 is a view similar to that of FIGURE 4 but showing a modified form of transparent element.

In FIGURE 1, the top tank of an automobile radiator is indicated at 10 and the level of coolant is indicated at 12. The tank is provided with a filler neck 14 to which is connected an overflow tube 16 and which is provided with an attaching flange 18. The attaching flange is of conventional design in that it is notched at opposite sides to receive opposed tabs 20 of a cover 22 so that the cover may be placed on the filler neck by the customary rotary bayonet-like form of attachment as also easily removed.

The cover 22 has opposed projections on its periphery such as the projection 24 to be grasped for rotating the same manually. A metal resilient sealing disk 26 is retained against the cover 22 by means of a coil spring 28 and the periphery of the sealing disk 26 is adapted to rest upon the filler neck flange 18 to seal the latter.

The filler neck 14 encloses an annular seat 30 which is, but not necessarily, a part of the top wall of the tank 10 and this seat surrounds a filler opening 32 leading to the tank interior. A sealing washer 34 is adapted to rest on the seat 30 with a pressure dictated by the loading of the spring 28 and the latter surrounds a rigid sleeve 36 which is axially movable through the cover 22 and the sealing disk 26. The sleeve is brazed as at 38 to a cup member 40 which bears a radial flange 41 supporting the sealing washer 34. An annular member 42 is in the form of a trough fixed to and within the cup member 40 and the outer peripheral edge of the member 42 aids in locating and holding the sealing washer 34 as a part of the closure when the latter is removed from the filler neck 14. An O-ring 44 together with a self-locking retainer ring 46 serves resiliently to hold a rod 56 within the sleeve 36 when squeezed between the annular member 42 and the cup member 40. A second self-locking retainer ring 50 is located above a central portion of the cover 22 and is locked in position around and on the outer surface of the sleeve 36 to move with the latter.

A thickened flange 52 of a rubber sealing sleeve 54 is retained within the trough-like member 42 and the sealing sleeve wall is tapered in a downward direction snugly to encompass the solid transparent member or cylindrical rod 56. This member or rod is preferably made of an optically clear material such as glass or plastic and its length and thickness dimensions are not critical although in the practice of this invention, it is found that the shorter the member and the larger the cross section of of the member, the better indication of liquid level is obtained. The top of the sleeve 36 has a top aperture 60 through which a large proportion of the upper end surface 62 of the member 56 is exposed and open to view. The other or lower end of the transparent member 56 has a flat surface 64 inclined at 45° with the plane of the cover 22 and the peripheral or cylindrical surface of the member 56 next to the flat inclined surface 64 is coated with a red paint 66.

In the operation of the device, if it be assumed that the closure is inserted in the filler neck 14 with the transparent member or rod 56 extending down through the tank opening 32, the sealing washer 34 will form a closure of the opening 32 and the sealing disk 26 will seal the top of the neck 14. The spring 28 will yield slightly causing a clearance between the cover 22 and the retainer ring 50. If excessive pressure occurs in the tank 12, the spring 28 will compress and that pressure will be relieved through the overflow tube 16. If an excessively low pressure begins to prevail in the tank 10, air will be admitted along the surface of the member 56 and through the sleeve 54. The fitting of the member 56 within the sleeve 36 will not be perfect and any slight imperfection is adequate to relieve a vacuum.

Assuming that the liquid level within the tank 10 is to be checked, a glance at the surface 62 will indicate whether or not the liquid level 12 has reached the inclined surface 64 or is above the surface on the one hand or whether that level is below the surface 64 on the other hand. The principle of operation is best described by reference to FIGURES 3 and 4 of the drawing. Light entering the rod 56 through the top surface 62 is transmitted down the rod to the surface 64 as shown by the solid line arrows in FIGURE 3. Surface 64 almost totally reflects light rays arriving at angles of incidence of near 42.7° and larger. As most of the light from the surface 62 arrives at 45° with the surface 64, it is reflected to the colored coating 66. Light is then reflected back from that coating to the surface 64 and back and through the surface 62 where it is visible to the eye. In other words, the colored surface 66 is seen when the surface 64 is in the air or in most common gases and vapors. The return light path is shown by the dash line arrows in FIGURE 3, when the liquid level is low—i.e.—has not attained the level of any part of the rod 56 or the surface 64.

When the lower end of the rod 56 is submerged in a liquid such as the liquid 70 in FIGURE 4 and when the refractive index of that liquid is somewhat greater than 1.0, the refracting capability of the surface 64 is reduced. As the refractive index of the liquid 70 approaches the refractive index of the rod, the angle of incidence where total refraction occurs approaches 90°. If the liquid is water and the rod is Pyrex type glass with indexes of refraction of 1.333 and 1.474 respectively, the critical angle is 64.7°. Under these conditions, most of the light passes through this surface 64 since the angle of incidence for the incoming light is less than the critical angle, thus making the surface 66 invisible. As long as the surface 64 is in the liquid 70, light will tend to pass through the interface instead of being reflected to and from the surface 66. The higher the index of refraction of the liquid, up to being equal to that of the rod, the more perfect the interface from an optical point of view. Useful results can be obtained with liquid of refractive indexes varying from about 1.1 and higher. Included in this range are alcohol, glycerin, benzene, engine oils and brake fluid.

A qualitative measuring indication may be had by utilizing a number of rods each of different length and properly identified but FIGURE 5 shows an improvement in which one transparent member 80 in the form of a plate is utilized to reflect a colored image giving an indication of liquid level within a given range. It will be noted that the member 80 is shown in the form of a plate having a refractive surface 82 inclined in two planes with respect to the top or viewing surface 84. In FIGURE 5, the solid arrows above the liquid level 86 represent light beams which are reflected back through the surface 84 whereas the solid arrows beneath the level 86 indicate that the light rays for the most part pass directly through the plate 80 and are not reflected from another surface of the plate 80. In FIGURE 5, the measure of the liquid level is quantitative or continuous within a range and if it is desired, the plate 80 may be made of clear plastic and could be conveniently packaged by forming it into a roll or tube. The back side of the plate 80, as seen in FIGURE 5, could bear a colored coating to enhance the effect.

It will be appreciated that a colored coating is not essential as intensity of the reflected light will serve but the use of such a coating is preferred.

I claim:

1. A tank closure comprising cover means attachable to a filler neck of a tank with said neck having an attaching flange and an inner seat and an overflow tube connected thereto between said flange and seat, said closure having sealing means adapted resiliently to contact said flange and seat and close said neck, a solid transparent element extending through said cover means and sealing means and having an inclined reflecting surface spaced from said sealing means at one side of said cover means and adapted to contact liquid in said tank, said transparent element being exposed at the other side of said cover means, and added sealing means interposed between said cover means and said transparent element and yieldable to open a passage along the surface of said transparent element and serve as a vacuum relief vent.

2. A tank closure as set forth in claim 1, said added sealing means being in the form of a thin sleeve of elastomeric material having one end surrounding but spaced from the said solid transparent element and the other end of the sleeve resiliently contacting said solid transparent element and expanding to form said vent when subject to a differential pressure.

References Cited

UNITED STATES PATENTS

| | | | |
|---|---|---|---|
| 1,883,971 | 10/1932 | Kryzanowsky | 73—327 |
| 2,528,791 | 11/1950 | Scoville | 123—41.15 |
| 2,615,337 | 10/1952 | Maybach | 73—327 |
| 2,627,748 | 2/1953 | Maybach et al. | 73—327 |
| 2,897,533 | 8/1959 | Bull et al. | 285—238 X |
| 3,000,345 | 9/1961 | Gray et al. | 116—117 |
| 3,098,663 | 7/1963 | Dibley | 285—158 X |
| 3,216,256 | 11/1965 | Barnes | 73—306 |
| 3,211,321 | 10/1965 | Holmes | 220—44 |
| 3,276,488 | 10/1966 | Holmes | 220—44 |
| 3,338,457 | 8/1967 | Tygenhof | 220—44 |

DAVID SCHONBERG, *Primary Examiner.*

DANIEL M. YASICH, *Assistant Examiner.*